(12) United States Patent
Hahn et al.

(10) Patent No.: US 10,513,072 B2
(45) Date of Patent: Dec. 24, 2019

(54) MULTIPLE EXTRUSION PRESS HEAD

(71) Applicant: KraussMaffei Berstorff GmbH, Hannover (DE)

(72) Inventors: Klaus Hahn, Ronnenberg (DE); Harald Hepke, Hannover (DE)

(73) Assignee: KraussMaffei Berstorff GmbH, Hannover (DE)

( * ) Notice: Subject to any disclaimer, the term of this patent is extended or adjusted under 35 U.S.C. 154(b) by 325 days.

(21) Appl. No.: 15/519,067

(22) PCT Filed: Nov. 9, 2015

(86) PCT No.: PCT/EP2015/076070
§ 371 (c)(1),
(2) Date: Apr. 13, 2017

(87) PCT Pub. No.: WO2016/078951
PCT Pub. Date: May 26, 2016

(65) Prior Publication Data
US 2017/0217072 A1    Aug. 3, 2017

(30) Foreign Application Priority Data
Nov. 21, 2014  (DE) .................. 10 2014 117 068

(51) Int. Cl.
*B29C 47/30* (2006.01)
*B29C 48/30* (2019.01)
(Continued)

(52) U.S. Cl.
CPC .............. *B29C 48/30* (2019.02); *B29C 48/03* (2019.02); *B29C 48/07* (2019.02); *B29C 48/18* (2019.02);
(Continued)

(58) Field of Classification Search
CPC ........ B29C 48/33; B29C 48/345; B29C 48/49
See application file for complete search history.

(56) References Cited

U.S. PATENT DOCUMENTS

| 6,213,748 B1 | 4/2001 | Bertram |
| 6,695,606 B1 | 2/2004 | Burg et al. |
| 2013/0156876 A1 | 6/2013 | Schnabel |

FOREIGN PATENT DOCUMENTS

| DE | 35 06 257 | 4/1986 |
| DE | 36 38 623 | 10/1987 |

(Continued)

OTHER PUBLICATIONS

International Search Report issued by the European Patent Office in International Application PCT/EP2015/076070 dated Feb. 4, 2016.

*Primary Examiner* — James Sanders
(74) *Attorney, Agent, or Firm* — Henry M. Feiereisen LLC (57) ABSTRACT

The invention relates to a multiple extrusion press head for producing tread profiles of tyres, comprising: a base body (12) having a first supply opening (22) for connecting a first extruder, a second supply opening (24) for connecting a second extruder, a third supply opening (26) for connecting a third extruder, and a fourth supply opening for connecting a fourth extruder; a first head part (14) which is mounted such that it can swivel in relation to the base body, and which has a receiving means (32) that is open in the direction of the base body (12); a second head part that is mounted such that it can swivel in relation to the base body (12); at least one flow channel insert (18, 20) that is mounted such that it can swivel in relation to the base body (12), wherein the first head part (14) and the second head part (16) can be brought into a closed state, in which the head parts (14, 16) are connected to one another in a pressure-tight manner, and a first flow channel (34), a second flow channel (36), a third (Continued)

flow channel (38) and a fourth flow channel (40) are formed in the multiple extrusion press head (10), wherein every flow channel is connected to a supply opening. According to the invention, the base body (12) has a fifth supply opening (30) for connecting a fifth extruder, and the multiple extrusion press head (10) has a second flow channel insert (20), which, independently of the first flow channel insert (18), is mounted such that it can swivel in relation to the base body (12), and borders a fifth flow channel (42) that is connected to the fifth supply opening (30).

17 Claims, 5 Drawing Sheets

(51) Int. Cl.
| | | |
|---|---|---|
| *B29C 48/345* | (2019.01) | |
| *B29C 48/03* | (2019.01) | |
| *B29C 48/33* | (2019.01) | |
| *B29C 48/27* | (2019.01) | |
| *B29D 30/52* | (2006.01) | |
| *B29C 48/07* | (2019.01) | |
| *B29C 48/18* | (2019.01) | |
| *B29C 48/49* | (2019.01) | |
| *B29K 21/00* | (2006.01) | |
| *B29L 30/00* | (2006.01) | |

(52) U.S. Cl.
CPC .......... *B29C 48/271* (2019.02); *B29C 48/304* (2019.02); *B29C 48/33* (2019.02); *B29C 48/345* (2019.02); *B29C 48/49* (2019.02); *B29D 30/52* (2013.01); *B29C 48/272* (2019.02); *B29K 2021/006* (2013.01); *B29L 2030/002* (2013.01)

(56) References Cited

FOREIGN PATENT DOCUMENTS

| | | |
|---|---|---|
| DE | 197 57 261 | 11/1998 |
| DE | 10 2011 111 463 | 2/2012 |
| DE | 10 2012 111 439 | 5/2014 |
| EP | 1 604 802 | 12/2005 |
| EP | 2 308 666 | 4/2011 |
| JP | H06-064842 | 9/1994 |

MULTIPLE EXTRUSION PRESS HEAD

CROSS-REFERENCES TO RELATED APPLICATIONS

This application is the U.S. National Stage of International Application No. PCT/EP2015/076070 filed Nov. 9, 2015, which designated the United States and has been published as International Publication No. WO 2016/078951 and which claims the priority of German Patent Application, Serial No. 10 2014 117 068.7, filed Nov. 21, 2014, pursuant to 35 U.S.C. 119(a)-(d).

BACKGROUND OF THE INVENTION

The invention relates to a multiple extrusion press head for producing tread profiles of tyres, comprising (a) a base body (12) having a first supply opening for connecting a first extruder, a second supply opening for connecting a second extruder, a third supply opening for connecting a third extruder and a fourth supply opening for connecting a fourth extruder, (b) a first head part which is mounted so that it can swivel in relation to the base body, and which has a receiving means that is open in the direction of the base body, (c) a second head part that is mounted so that it can swivel in relation to the base body, (c) at least one flow channel insert, that is mounted so that it can swivel relative to the base body, (c) wherein the first head part and the second head part can be brought into a closed state, in which the head parts are connected to one another in a pressure-tight manner, and a first flow channel, a second flow channel, a third flow channel and a fourth flow channel are formed in the multiple extrusion press head, wherein every flow channel is connected to a, in particular respectively precisely to one, supply opening.

Such a multiple extrusion press head is known from DE 197 57 261 C1 and is used for producing tread profiles of tyres. These tread profiles must fulfil various requirements at different locations, so that they are produced from more than one material, generally caoutchouc or rubber. The material is supplied to the extruder through the extrusion press head.

A disadvantage in known multiple extrusion press heads is that tread strips which are required for the manufacture of upgraded tyres, can not be produced.

SUMMARY OF THE INVENTION

The invention is based on the problem of improving the manufacture of tread strips.

The invention solves the problem by a generic multiple extrusion press head, in which the base body has a supply opening for connecting a fifth extruder and which has a second flow channel insert which, independently of the first flow channel insert, is mounted so that it can swivel in relation to the base body, and borders a fifth flow channel that is connected to the fifth supply opening.

It is advantageous in such a multiple extrusion press head that more complex tread strips can be produced. Through the additional flow channel, a further region can be produced, which has different material properties to tread strips able to be produced hitherto.

It is advantageous, in addition, that the multiple extrusion press head can be cleaned easily, despite the extended possibility for the manufacture of more complex tread strips. The supplying of material for a further flow channel is not readily possible, because it must be ensured that the extrusion press head can be cleaned. This is made possible through the swivellability of the second flow channel insert.

It is beneficial if the first head part is arranged above the second head part. In particular, it is advantageous if the first head part is mounted so that it can swivel about a transverse axis. This feature is understood to mean, in particular, that the head part is mounted so that it can swivel about a swivel axis which assumes with the horizontal an angle of at most 15°, in particular at most 2°. As a rule, it is advantageous if the rotation axis, about which the first head part is swivellable, runs, with as good an approximation as possible, horizontally.

In addition, it is beneficial if the second head part is mounted so that it can swivel about a second transverse axis, wherein the second transverse axis extends in the same direction as the first transverse axis. This is to be understood to mean, in particular, that it is beneficial if the first transverse axis and the second transverse axis form as small an angle as possible with respect to one another, wherein minor deviations are possible. In particular, the angle between the first transverse axis and the second transverse axis is preferably smaller than 10°, in particular smaller than 2°.

According to a preferred embodiment, the first flow channel insert and the second flow channel insert have a common sealing surface. In other words, the first flow channel insert and the second flow channel lie against one another so that they touch each other in one surface. This surface is configured so that rubber, under pressure, present in the flow channels, would creep along the sealing surface if the first flow channel insert and the second flow channel insert were not tensioned towards one another. The advantage to this is that a compact structural form is produced and that the flow channel inserts, in addition, are easy to clean. When the flow channel inserts are namely swivelled out, they separate from one another along their sealing surface up to the screw tip, and the flow channels formed by the flow channel inserts can be cleaned simply by the extrusion press material which is injected to a profile by means of the extrusion press head.

If no further flow channel insert is present in addition to the first and the second flow channel insert, the second flow channel insert preferably also has a sealing surface with the first head part. The advantages described above then also arise for the remaining flow channels. However, it is possible that the multiple extrusion press head has a third flow channel insert which, independently of the first flow channel insert and of the second flow channel insert, is mounted so that it can swivel in relation to the base body.

According to a preferred embodiment, the flow channel inserts are mounted so that they can swivel in relation to the base body about a common rotation axis. Preferably, the rotation axis runs at an angle of at most 15° to the horizontal.

It is advantageous in a common swivel axis that the extrusion press head is able to be operated particularly reliably with regard to the process. In addition, a high degree of tightness is produced by simple means, and the manufacture is facilitated.

Preferably, the flow channel inserts are configured so that when the head parts are in closed state, the first flow channel insert and the second flow channel insert touch one another and form a flow channel between one another. The latter can be easily cleaned by selective swivelling away of the individual flow channel inserts.

Preferably, the multiple extrusion press head has an insert locking device, by means of which the second flow channel insert is able to be fixed in relation to the base body so that rubber present in the second flow channel, at a pressure of 2.5 MPa, is able to be held in the flow channel, wherein the insert locking device is configured so that the first head part can swivel in relation to the second flow channel insert when the second flow channel insert is fixed in relation to the base body. It is then possible to swivel only the head part away and, for example, to clean it without the first flow channel also having to be cleaned. In previous extrusion press heads it is always necessary to clean all the flow channels when the extrusion press head is opened. In particular when the second flow channel must be cleaned at shorter intervals, the insert locking device saves additional cleaning effort.

The multiple extrusion press head preferably comprises in addition a first head fixing device, by means of which the first head part can be fixed in relation to the base body, wherein the first head fixing device is configured so that the first head part can be swivelled in relation to the base body when the second head part is fixed in relation to the base body. When the second head part is fixed in relation to the base body, this means in particular that rubber present in the first flow channel and in the second flow channel, at a pressure of 2.5 MPa, is able to be held in the flow channel. The rubber can therefore not penetrate laterally into the sealing surfaces. When the first head part is arranged above the second head part, all flow channels can be cleaned above, whereas the lower ones do not necessarily also have to be cleaned.

According to a preferred embodiment, the multiple extrusion press head comprises a head fixing device, by means of which the head parts and all flow channel inserts can be fixed in relation to the base body. The head fixing device is configured in particular so that the internal pressure prevailing during extruding is absorbed. This head fixing device is preferably independent of the insert locking device and/or of the second head fixing device. This has the advantage that the other fixing devices which are possibly present can be designed for a smaller force, which simplifies the construction. For example, the head fixing device is configured for the form-fitting fixing of the head parts.

The multiple extrusion press head preferably comprises an actuating device for the motor-driven swivelling of the second flow channel insert. This facilitates the cleaning and in addition reduces the risk of accident, because generally no additional tool is necessary in order to swivel the second flow channel insert away.

Preferably, the multiple extrusion press head has a second head fixing device for the motor-driven swivelling and fixing of the second head part in relation to the base body.

It is particularly beneficial if all the flow channel inserts respectively have a drive, by means of which the flow channels can be swivelled automatically. Each of these drives is preferably configured for applying a locking force onto the respective flow channel insert, which is thus greater than the force which is exerted by rubber in the flow channel at a pressure of 2.5 MPa. The rubber is then reliably held in the flow channel. It is thus prevented that all flow channels have to be cleaned, although only one flow channel requires cleaning.

The invention solves the problem in addition by a tread profile production device for producing tread profiles of vehicle tyres, with a multiple extrusion press head as set forth above, a first extruder, which is connected to the first supply opening, a second extruder, which is connected to the second supply opening, a third extruder, which is connected to the third supply opening, a fourth extruder, which is connected to the fourth supply opening, and at least one fifth extruder, which is connected to the at least one fifth supply opening.

BRIEF DESCRIPTION OF THE DRAWING

The invention is explained in further detail below with the aid of the enclosed drawings. There are shown here FIG. 1 a cross-section through a multiple extrusion press head according to the invention, in which a head part and a flow channel insert are swivelled away, FIG. 2 the multiple extrusion press head according to FIG. 1, in which only the first head part is swivelled away, and FIG. 3 the multiple extrusion press head in the closed state.

DETAILED DESCRIPTION OF PREFERRED EMBODIMENTS

Figure 1:
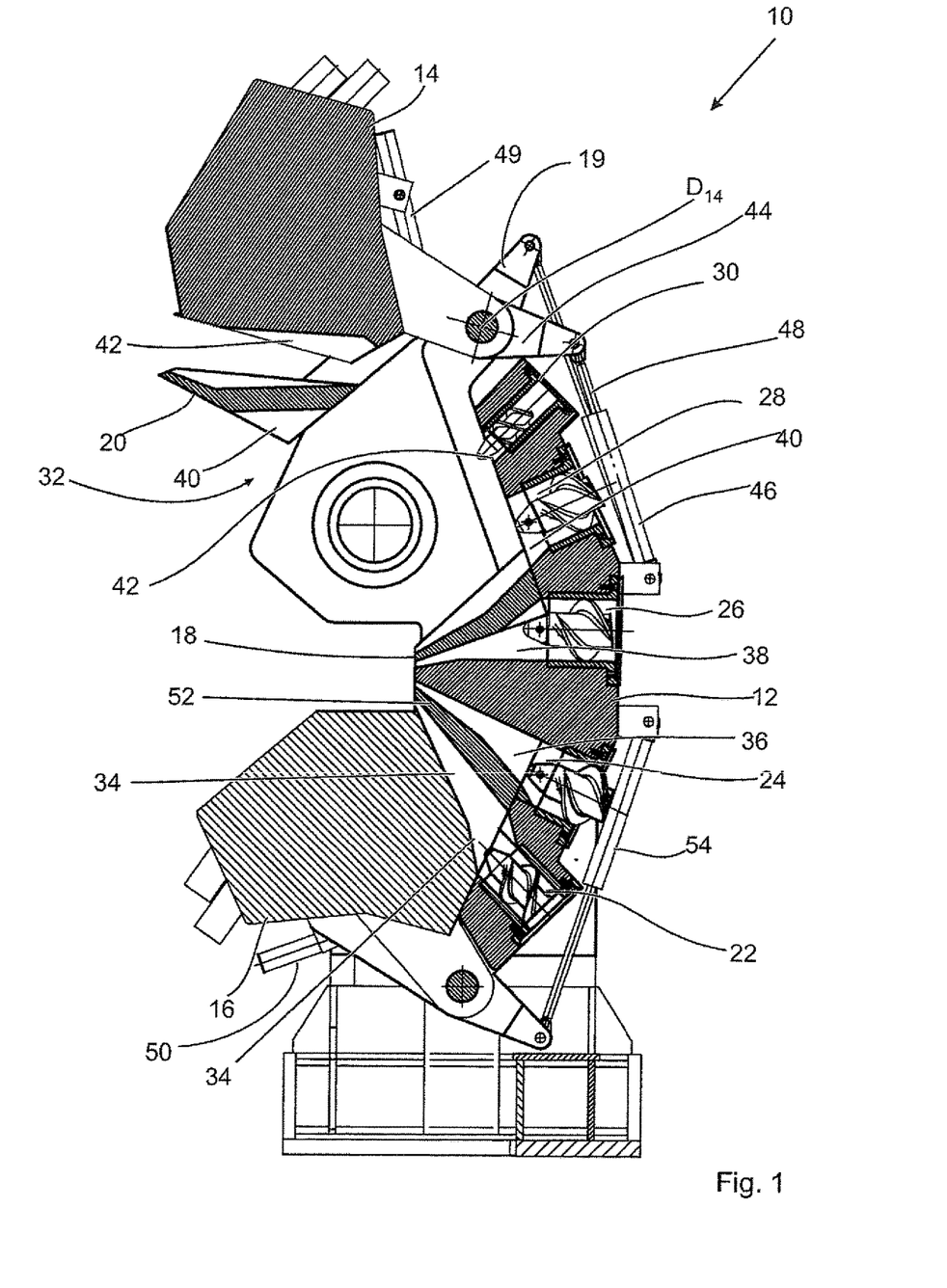

FIG. 1 shows a multiple extrusion press head 10 according to the invention, which comprises a base body 12, a first head part 14, a second head part 16, a first flow channel insert 18 and a second flow channel insert 20.

The base body 12 has a first supply opening 22, a second supply opening 24, a third supply opening 26, a fourth supply opening 28 and a fifth supply opening 30. Material, for example rubber or caoutchouc, to be injected during operation of the multiple extrusion press head 10, is supplied at a pressure p of at least 2.5 MPa by respectively an extruder through all supply openings 22, 24, 26, 28, 30. The ends of the extruder screws of the respective extruders are shown diagrammatically, which project into the supply openings 22, 24, 26, 28, 30.

The first head part 14 is mounted so that it can swivel in relation to the base body 12 about a horizontal rotation axis $D_{14}$. The first head part 14 has a receiving means 32, which is open to the base body 12. This is to be understood to mean that the first head part 14 forms a cavity with the base body 12 in the region of the receiving means 32, when the first head part 14 is in the closed position shown in FIG. 3. In particular the second flow channel insert 20 is arranged in this cavity. The second head part 16 is mounted so that it can swivel about a rotation axis $D_{16}$.

The multiple extrusion press head comprises a first flow channel 34, which extends out from the first supply opening 22, a second flow channel 36, which extends out from the second supply opening 24, a third flow channel 38, which extends out from the third supply opening 26, a fourth flow channel 40, which extends out from the fourth supply opening 28, and a fifth flow channel 42, which extends away from the fifth supply opening 30.

Figure 2:
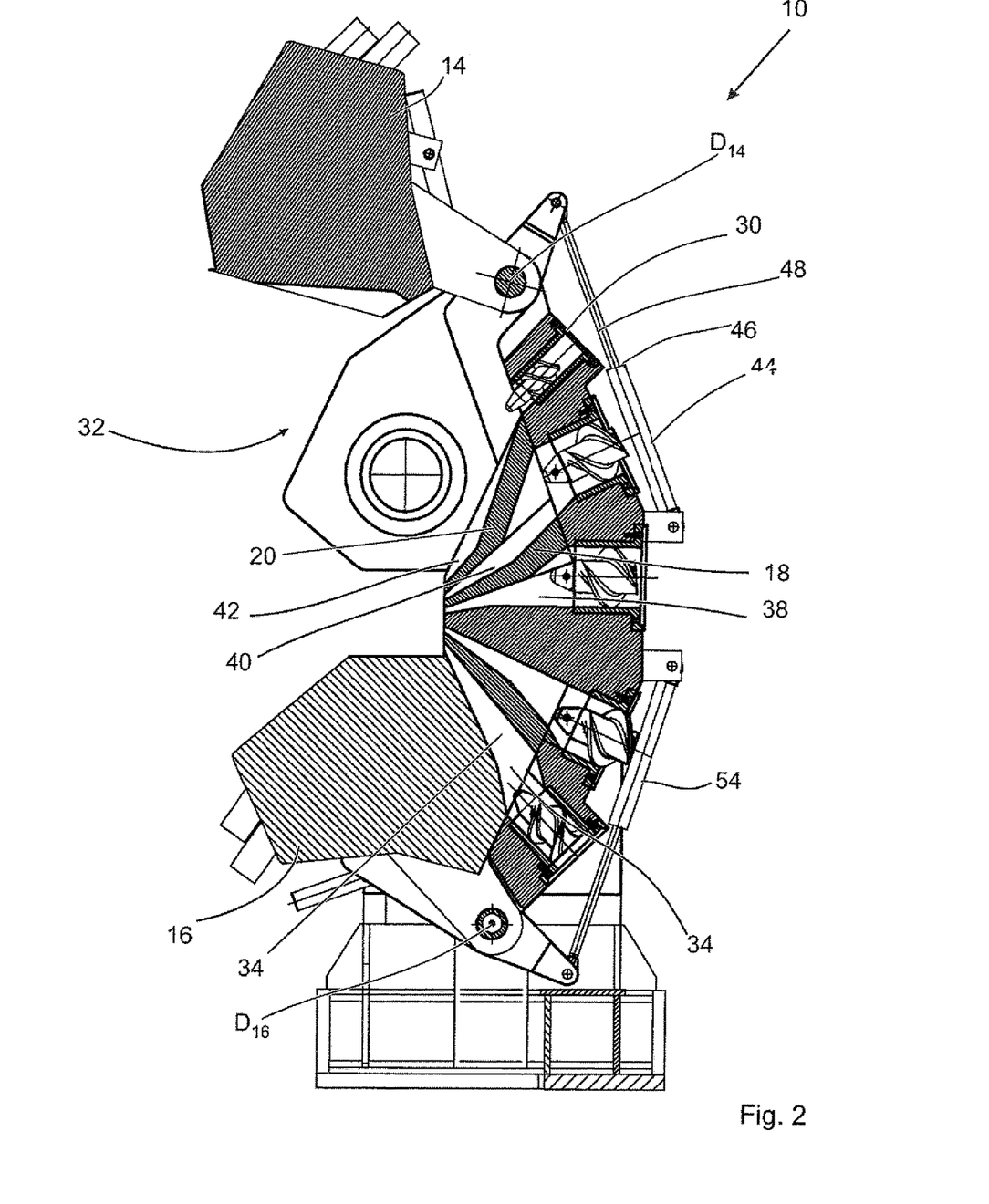

FIG. 2 shows that the second flow channel insert 20 borders both the fourth flow channel 40 and also the fifth flow channel 42. The first flow channel insert 18 and the second flow channel insert 20 touch one another and form between one another the fourth flow channel 40. It can be seen in addition that the first flow channel insert 18 borders the third flow channel 38 and the fourth flow channel 40. The first flow channel insert 18 is swivellable by means of a drive 19 about the rotation axis $D_{14}$, about which the first head part 14 is also mounted so that it can swivel. In FIG. 2, the first head fixing device 49 (see FIG. 1) is not shown in the drawing.

The multiple extrusion press head 10 has an insert locking device 44, by means of which the second flow channel insert 20 is able to be pressed towards the base body 12. In the present case, the insert locking device 44 comprises a hydraulic cylinder 46, the piston rod 48 of which acts on the second flow channel insert 20 (cf. FIG. 1). The insert locking device 44 is configured such that it presses the second flow channel insert 20 so firmly against the base body 12 that material present in the flow channel, which is at a pressure of 2.5 MPa, in particular of 3.5 MPa, can not press the second flow channel insert 20 away from the base body 12.

It can be seen that the first head part 14 is swivellable in relation to the second flow channel insert 20 by means of a first head fixing device 49, in particular also when the second flow channel insert 20 is fixed in relation to the base body 12 by means of the insert locking device 44.

FIG. 1 shows in addition a second head fixing device 50, which in the present case also comprises a hydraulic cylinder. The second head fixing device 50 acts on the second head part 16, so that the latter is able to be fixed in relation to the base body 12. As is shown in FIG. 1, the first head part 14 can be swivelled in relation to the base body 12, when the second head part 16 is fixed in relation to the base body 12. The second head fixing device 50 is designed so that the material in the first flow channel 34 can be at a pressure of circa 5 MPa, in particular 3.5 MPa, without this pressure being able to press the second head part 16 away from the base body 12.

By means of the second head fixing device 50, the second head part 16 can be brought up in addition. The second head fixing device could thereby also be designated as an actuating device.

Figure 3:
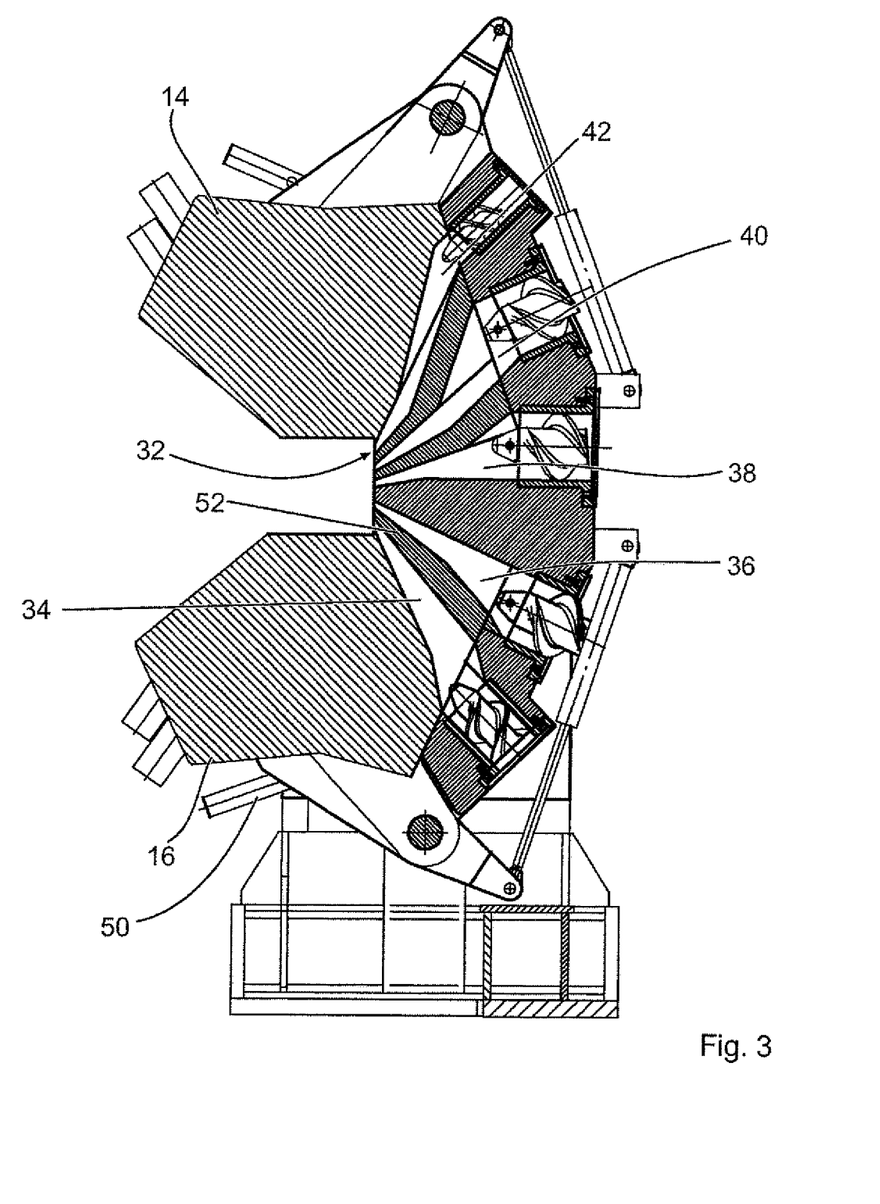

FIG. 3 shows the multiple extrusion press head 10 in the closed state. It is part of a tread profile production device according to the invention, which in addition to the multiple extrusion press head 10 has five extruders, respectively one of which is connected with precisely one of the supply openings 22, 24, 26, 28, 30 for the supplying of extrusion material.

Figure 4:
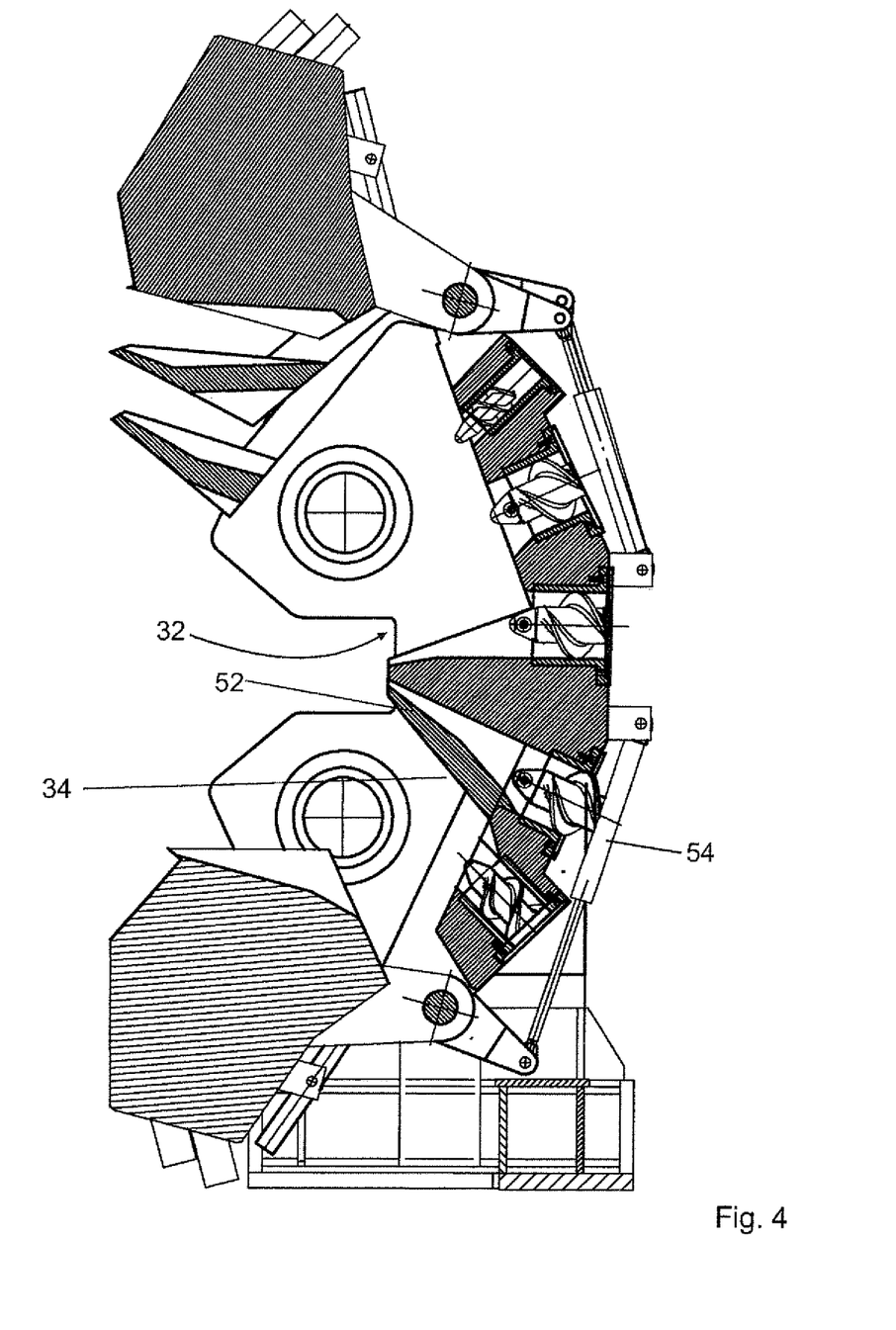
FIG. 4 shows the multiple extrusion press head in which only the second flow channel is closed and FIG. 5 shows the multiple extrusion press head according to FIG. 4, in which the first head part is swivelled away and the second head part is in the closed position.

FIG. 4 shows the multiple extrusion press head 10 with opened second head part 16 and with a third flow channel insert 52 which, independently of the second head part 16, is swivellable in a motor-driven manner by means of a drive 54. The third flow channel insert 52 borders the second flow channel 36 and the first flow channel 34.

Figure 5:
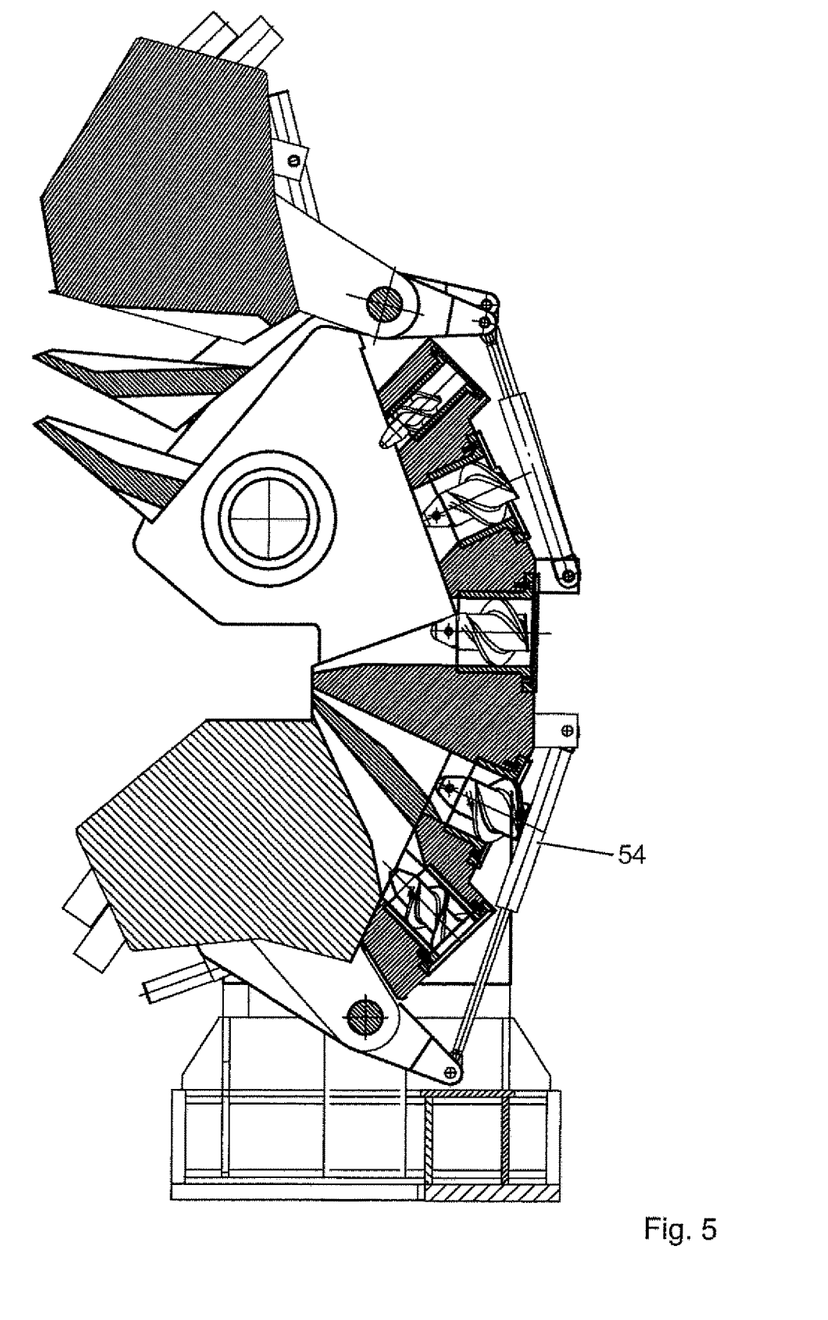

FIG. 5 shows the multiple extrusion press head, in which the first head part is swivelled away and the second head part is in the closed position.

The flow channel inserts 18, 20 and 52, as represents a preferred embodiment, are fastened to respective arms, wherein the arms are mounted so that they can swivel. This makes it possible to exchange the flow channel inserts.

What is claimed is:

1. A multiple extrusion press head for producing a tread profile of a tyre, comprising:
    a base body having a first supply opening for connecting a first extruder, a second supply opening for connecting a second extruder, a third supply opening for connecting a third extruder, a fourth supply opening for connecting a fourth extruder, and a fifth supply opening for connecting a fifth extruder;
    first and second head parts which are each swingably mounted in relation to the base body and movable to assume a closed state in which the first and second head parts are connected to one another in a pressure-tight manner;
    a first flow channel insert swingably mounted in relation to the base body,
    first, second, third and fourth flow channels connected to the first, second, third and fourth supply openings respectively; and
    a second flow channel insert swingably mounted in relation to the base body independently of the first flow channel insert and bordering a fifth flow channel which is connected to the fifth supply opening;
    wherein the first and second flow channel inserts are swingably mounted in relation to the base body for rotation about a common rotation axis.

2. The multiple extrusion press head of claim 1, wherein the first head part has a receiving means that is open in a direction of the base body.

3. The multiple extrusion press head of claim 1, wherein the first and second flow channel inserts have a common sealing surface.

4. The multiple extrusion press head of claim 1, wherein the first and second flow channel inserts touch one another in the closed state of the first and second head parts and form the fourth flow channel there between.

5. The multiple extrusion press head of claim 1, further comprising an insert locking device configured to fix the second flow channel insert in relation to the base body and thereby hold rubber received in the first flow channel at a pressure of at least 2.5 megapascal (25 bar) in place in the first flow channel, said insert locking device being configured such that the first head part is capable of swivelling in relation to the second flow channel insert when the second flow channel insert is fixed in relation to the base body.

6. The multiple extrusion press head of claim 1, further comprising a first head fixing device configured to allow the first head part to be moved and fixed in relation to the base body and to allow the first head part to swivel in relation to the base body, when the second head part is fixed in relation to the base body.

7. The multiple extrusion press head of claim 1, further comprising a head fixing device configured for fixing the first and second head parts and the first and second flow channel inserts in relation to the base body.

8. The multiple extrusion press head of claim 1, further comprising an actuating device for motor-driven swivelling of the second flow channel insert in relation to the first flow channel insert.

9. The multiple extrusion press head of claim 1, further comprising a second head fixing device for motor-driven swivelling and fixing of the second head part in relation to the base body.

10. A tread profile production device for producing a tread profile of a vehicle tyre, comprising:
    a multiple extrusion press head including a base body having first, second, third, fourth and fifth supply openings, first and second head parts which are each swingably mounted in relation to the base body and movable to assume a closed state in which the first and second head parts are connected to one another in a pressure-tight manner, a first flow channel insert swingably mounted in relation to the base body, first, second, third and fourth flow channels connected to the first, second, third and fourth supply openings respectively, and a second flow channel insert swingably mounted in relation to the base body independently of the first flow channel insert and bordering a fifth flow channel which is connected to the fifth supply opening;
    a first extruder connected to the first supply opening;
    a second extruder connected to the second supply opening;

a third extruder connected to the third supply opening;
a fourth extruder connected to the fourth supply opening, and
a fifth extruder connected to the fifth supply opening;
wherein the first and second flow channel inserts are swingably mounted in relation to the base body for rotation about a common rotation axis.

11. The tread profile production device of claim 10, wherein the first and second flow channel inserts have a common sealing surface.

12. The tread profile production device of claim 10, wherein the first and second flow channel inserts touch one another in the closed state of the first and second head parts and form the fourth flow channel there between.

13. The tread profile production device of claim 10, wherein the multiple extrusion press head includes an insert locking device configured to fix the second flow channel insert in relation to the base body and thereby hold rubber received in the first flow channel at a pressure of at least 2.5 megapascal (25 bar) in place in the first flow channel, said insert locking device being configured such that the first head part is capable of swivelling in relation to the second flow channel insert when the second flow channel insert is fixed in relation to the base body.

14. The tread profile production device of claim 10, wherein the multiple extrusion press head includes a first head fixing device configured to allow the first head part to be moved and fixed in relation to the base body and to allow the first head part to swivel in relation to the base body, when the second head part is fixed in relation to the base body.

15. The tread profile production device of claim 10, wherein the multiple extrusion press head includes a head fixing device configured for fixing the first and second head parts and the first and second flow channel inserts in relation to the base body.

16. The tread profile production device of claim 10, wherein the multiple extrusion press head includes an actuating device for motor-driven swivelling of the second flow channel insert in relation to the first flow channel insert.

17. The tread profile production device of claim 10, wherein the multiple extrusion press head includes a second head fixing device for motor-driven swivelling and fixing of the second head part in relation to the base body.

* * * * *